(12) United States Patent
Nishioka

(10) Patent No.: US 12,260,736 B2
(45) Date of Patent: Mar. 25, 2025

(54) DISPLAY SYSTEM, DISPLAY DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Hiroki Nishioka, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/212,416

(22) Filed: Jun. 21, 2023

(65) Prior Publication Data

US 2023/0419814 A1 Dec. 28, 2023

(30) Foreign Application Priority Data

Jun. 22, 2022 (JP) ................................ 2022-100564

(51) Int. Cl.
| | |
|---|---|
| G06V 20/52 | (2022.01) |
| G06V 10/77 | (2022.01) |
| G06V 10/774 | (2022.01) |
| G06V 40/20 | (2022.01) |
| G08B 21/24 | (2006.01) |
| G09G 3/00 | (2006.01) |

(52) U.S. Cl.
CPC ......... *G08B 21/24* (2013.01); *G06V 10/7715* (2022.01); *G06V 10/774* (2022.01); *G06V 20/52* (2022.01); *G06V 40/23* (2022.01); *G06V 40/25* (2022.01); *G09G 3/002* (2013.01); *G09G 2354/00* (2013.01)

(58) Field of Classification Search
CPC . G08B 21/24; G08B 5/36; G08B 7/06; G06V 10/7715; G06V 10/774; G06V 40/25; G06V 10/82; G06V 40/23; G06V 20/52; G06V 40/20; G09G 3/002; G09G 2354/00; H04N 9/3141
See application file for complete search history.

(56) References Cited

U.S. PATENT DOCUMENTS 6,924,741 B2 *  8/2005  Tamayama ....... G08B 13/19697
                                            340/925
8,423,431 B1 *  4/2013  Rouaix ................ G06Q 10/087
                                            705/28

(Continued)

FOREIGN PATENT DOCUMENTS

| JP | 2003-271084 A | 9/2003 |
|---|---|---|
| JP | 2014-123277 A | 7/2014 |

*Primary Examiner* — Adam R. Giesy
(74) *Attorney, Agent, or Firm* — Oliff PLC

(57) ABSTRACT

A display system is provided with a display device, a first imaging device, a storage device, and a processing device. The display device displays an image based on content information at a display position. The first imaging device images a human who is going to pass through the display position. The storage device stores a learned model obtained by performing machine learning on a correspondence relation between features of a behavior of the human, the content information to be used for the image, and a degree of risk of the human. The processing device obtains pre-passage behavior data representing a behavior of the human based on imaging result of the first imaging device, and determines the content information to be used for the image using the pre-passage behavior data and the learned model.

11 Claims, 10 Drawing Sheets

(56) References Cited

U.S. PATENT DOCUMENTS

| | | | |
|---|---|---|---|
| 10,345,686 B2 * | 7/2019 | Muramatsu | H04N 23/69 |
| 2010/0153003 A1 * | 6/2010 | Merkel | G01C 21/20 |
| | | | 701/533 |
| 2014/0176599 A1 | 6/2014 | Watanabe et al. | |

* cited by examiner

DISPLAY SYSTEM, DISPLAY DEVICE, AND NON-TRANSITORY COMPUTER-READABLE STORAGE MEDIUM STORING PROGRAM

The present application is based on, and claims priority from JP Application Serial Number 2022-100564, filed Jun. 22, 2022, the disclosure of which is hereby incorporated by reference herein in its entirety.

BACKGROUND

1. Technical Field

The present disclosure relates to a display system, a display device, and a non-transitory computer-readable storage medium storing a program.

2. Related Art

In the past, there has been known a display system for displaying an image corresponding to a human behavior. For example, a system described in JP-A-2014-123277 (Document 1) is provided with a display device, a camera, and a server, wherein the camera takes an image of a target human, and the server predicts a future action of the target human based on the taken image by the camera, and then makes the display device display a warning image generated in accordance with the prediction result.

In the system described in Document 1, since the effect of the warning display is not sufficiently considered, appropriate attention calling cannot be performed on the target human in some cases.

SUMMARY

A display system according to an aspect of the present disclosure includes a display device configured to display an image based on content information at a display position, a first imaging device, a storage device configured to store a learned model obtained by performing machine learning on a correspondence relation between pre-passage behavior data representing features of a behavior of a human who is going to pass through the display position imaged by the first imaging device, the content information to be used for the image, and a degree of risk of the human who passed through the display position, and a processing device, wherein the processing device performs obtaining first pre-passage behavior data representing features of a behavior of a first human who is going to pass through the display position based on an imaging result obtained by imaging the first human who is going to pass through the display position using the first imaging device, and determining first content information to be used for a first image corresponding to the first pre-passage behavior data using the first pre-passage behavior data and the learned model.

A display device according to an aspect of the present disclosure is a display device configured to display an image based on content information at a display position, including a storage device configured to store a learned model obtained by performing machine learning on a correspondence relation between pre-passage behavior data representing features of a behavior of a human who is going to pass through the display position, the content information to be used for the image, and a degree of risk of a human who passed through the display position, and a processing device, wherein the processing device performs obtaining first pre-passage behavior data representing features of a behavior of a first human who is going to pass through the display position based on an imaging result obtained by imaging the first human who is going to pass through the display position, and determining first content information to be used for a first image corresponding to the first pre-passage behavior data using the first pre-passage behavior data and the learned model.

A non-transitory computer-readable storage medium storing a program makes a computer execute processing including obtaining first pre-passage behavior data representing features of a behavior of a first human who is going to pass through the display position based on an imaging result obtained by imaging the first human who is going to pass through the display position of a first image based on first content image, and determining first content information to be used for the first image using a learned model obtained by performing machine learning on a correspondence relation between features of a behavior of a human who is going to pass through the display position, content information to be used for an image, and a degree of risk of the human who passed through the display position, and the first pre-passage behavior data.

DESCRIPTION OF EXEMPLARY EMBODIMENTS

Figure 1:
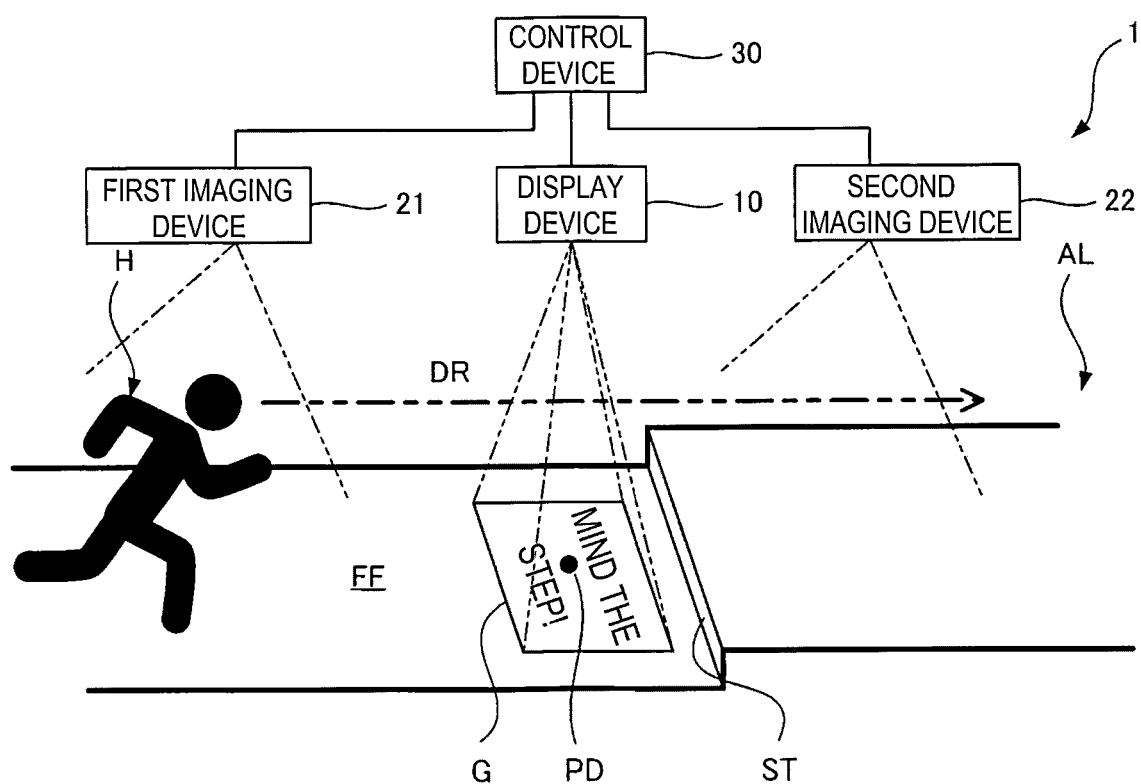
FIG. 1 is a schematic diagram of a display system according to a first embodiment.

Some preferred embodiments related to the present disclosure will hereinafter be described with reference to the accompanying drawings. It should be noted that in the drawings, dimensions and scale sizes of each part are arbitrarily different from the reality, and some portions are shown schematically in order to make understanding easy. Further, the scope or the spirit of the present disclosure is not limited to these embodiments unless there is a particular description of limiting the present disclosure in the following explanation.

1. First Embodiment

1-1. General Description of Display System

FIG. 1 is a schematic diagram of a display system 1 according to a first embodiment. The display system 1 is a system which displays an image G corresponding to a behavior of a human H at a display position PD to thereby draw attention on the human H.

In the example shown in FIG. 1, the display system 1 performs the attention calling on the human H passing through an aisle AL with the image G. Here, on a floor surface FF, there is disposed a step ST in the middle in a length direction of the aisle AL. The display position PD is set on the floor surface FF at a position adjacent to the step ST at the back side in a traveling direction DR of the human H. In FIG. 1, there is illustrated the image G displaying that attention of the human H to the step ST is called. The traveling direction DR is one direction along the length direction of the aisle AL.

It should be noted that the aspect of a width, a shape, or the like of the aisle AL is not limited to an example shown in FIG. 1, and is arbitrary. Further, the display position PD is not limited to the example shown in FIG. 1, and can be, for example, a position with a distance from the step ST, or can also be a position on a screen disposed in the aisle AL, or a position on wall surfaces at both sides of the aisle AL or on a surface of the ceiling. The display position PD is, for example, the center of the image G.

The display system 1 is provided with a display device 10, a first imaging device 21, a second imaging device 22, and a control device 30. Hereinafter, these will simply be described based on FIG. 1.

The display device 10 is a projector for displaying the image G at the display position PD under the control by the control device 30. It should be noted that a detailed configuration of the display device 10 will be described later based on FIG. 2.

The first imaging device 21 is a camera which has an imaging element such as a CCD (Charge Coupled Device) image sensor or a CMOS (Complementary MOS) image sensor for taking an image of the human H who has not passed through the display position PD.

The second imaging device 22 is a camera which has an imaging element such as a CCD image sensor or a CMOS image sensor for taking an image of the human H who has passed through the display position PD. It should be noted that it is possible for the first imaging device 21 to function also as the second imaging device 22.

The control device 30 determines a display content and a display method of the image G corresponding to the behavior of the human H who has not passed through the display position PD based on the imaging result of the first imaging device 21, and then displays the image G having the display content thus determined at the display position PD with the display method thus determined using the display device 10. Here, in the determination of the display content and the display method of the image G, there is used a learned model PJ described later obtained by performing the machine learning on a predetermined correspondence relation so as to minimize a degree of risk of the human H who has passed through the display position PD. Further, the control device 30 performs relearning of the learned model PJ described later using the imaging result of the second imaging device 22. It should be noted that a detailed configuration of the control device 30 will be described later based on FIG. 2.

In the display system 1 schematically described hereinabove, since the display content and the display method of the image G are determined using the learned model PJ described later obtained by performing the machine learning on the predetermined correspondence relation so as to minimize the degree of risk of the human H who has passed through the display position PD, it is possible to draw attention effectively with the image G.

1-2. Configuration of Display System

Figure 2:
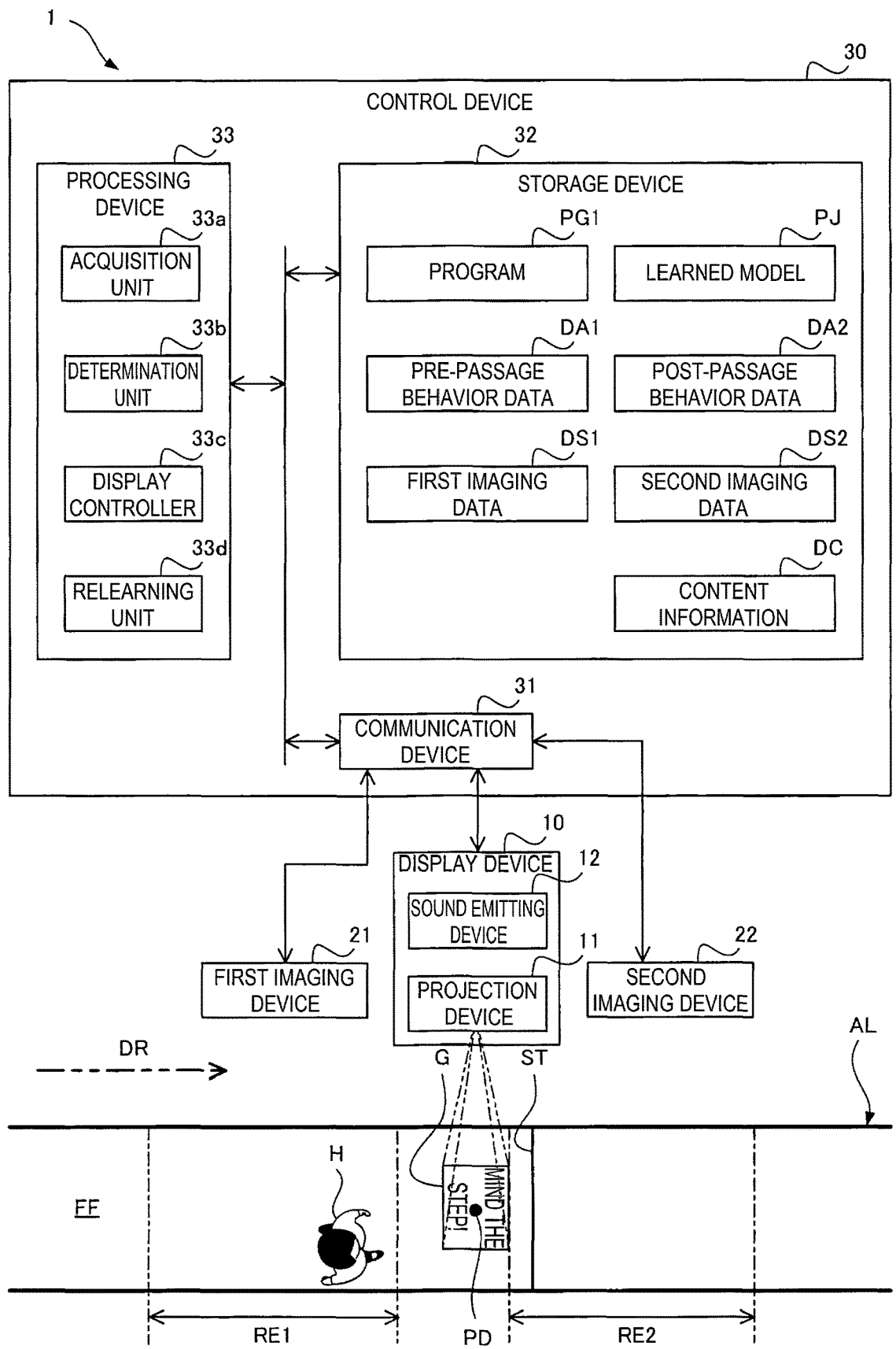
FIG. 2 is a block diagram of the display system according to the first embodiment.

FIG. 2 is a block diagram of the display system 1 according to the first embodiment. In FIG. 2, there is additionally illustrated a diagram obtained by viewing the aisle AL from vertically above besides an electrical configuration of the display system 1. As described above, the display system 1 is provided with the display device 10, the first imaging device 21, the second imaging device 22, and the control device 30. Hereinafter, parts of the display system 1 will sequentially be described in detail based on FIG. 2.

As shown in FIG. 2, the display device 10 is provided with a projection device 11 as an optical device, and a sound emitting device 12.

The projection device 11 is a mechanism of projecting the image G at the display position PD under the control by the control device 30. Although not illustrated, the projection device 11 has, for example, an image processing circuit, a light source, a light modulation device, and a projection optical system.

The image processing circuit of the projection device 11 is a circuit of generating an image signal for driving the light modulation device using the image data in content information DC from the control device 30. Specifically, the image processing circuit has a frame memory, develops the image data in the content information DC in the frame memory, and then arbitrarily executes a variety of types of processing such as resolution conversion processing, resizing processing, and distortion correction processing to thereby generate the image signal.

The light source of the projection device 11 includes, for example, a halogen lamp, a xenon lamp, a super-high pressure mercury lamp, an LED (Light Emitting Diode), or a laser source. For example, the light source emits white light, or individually emits red light, green light, and blue light. When the light source emits the white light, the light emitted from the light source is reduced in unevenness of a luminance distribution by an integrator optical system not shown, and is then separated by a color separation optical system not shown into the red light, the green light, and the blue light, and then enters the light modulation device of the projection device 11.

The light modulation device of the projection device 11 includes three light modulation elements provided so as to correspond to the red, green, and blue colors described above. The three light modulation elements each include, for example, a transmissive liquid crystal panel, a reflective liquid crystal panel, or a DMD (Digital Mirror Device). The three light modulation elements respectively modulate the red light, the green light, and the blue light based on the image signal from the image processing circuit of the projection device 11 to generate image light beams of the respective colors. The image light beams of the respective colors are combined with each other by a color combining optical system not shown to thereby turn to full-color image light.

The projection optical system of the projection device 11 projects the full-color image light described above so as to form an image on the projection surface. The projection optical system is, for example, an optical system including a projection lens. It should be noted that it is possible for the projection optical system to include, for example, a zoom lens or a focusing lens in addition to the projection lens.

The sound emitting device 12 is a speaker for emitting a sound around the display position PD using audio data in the content information DC from the control device 30. The sound emitting device 12 can also include a circuit such as an audio amplifier for reproducing the audio data. It should be noted that the sound emitting device 12 can be disposed separately from the display device 10 outside the display device 10.

The first imaging device 21 generates first imaging data DS1 by taking an image of the human H in a first region RE1. The first imaging data DS1 can be either one of still image data and moving image data, but it is preferable to be the moving image data since it is possible to extract features of the behavior of the human H in good condition. The format of the first imaging data DS1 is not particularly limited and can be arbitrary, but it is, for example, a data format for still images or moving images known to the public.

In the example shown in FIG. 2, the first region RE1 is a region which extends over a predetermined range along the length direction of the aisle AL at the rear side in the traveling direction of the human H with respect to the display position PD. It is sufficient for the length of the first region RE1 along the length direction of the aisle AL to be able to extract the features of the behavior of the human H from the imaging results of the first imaging device 21, and the length thereof is, for example, no smaller than 1 m and no larger than 2 m.

The first imaging device 22 generates second imaging data DS2 by taking an image of the human H in a second region RE2 different from the first region RE1. The second imaging data DS2 can be either one of still image data and moving image data, but it is preferable to be the moving image data since it is possible to extract features of the behavior of the human H in good condition. The format of the second imaging data DS2 is not particularly limited and can be arbitrary, but it is, for example, a data format for still images or moving images known to the public.

In the example shown in FIG. 2, the second region RE2 is a region which extends over a predetermined range along the length direction of the aisle AL at the front side in the traveling direction DR of the human H with respect to the display position PD. It is sufficient for the length of the second region RE2 along the length direction of the aisle AL to be able to extract the features of the behavior of the human H from the imaging results of the second imaging device 22, and the length thereof is, for example, no smaller than 1 m and no larger than 2 m. It should be noted that the first imaging device 21 can serve as both of the first imaging device 21 and the second imaging device 22 when the imaging range of the first imaging device 21 encompasses both of the first region RE1 and the second region RE2.

The control device 30 is a computer which executes a program PG1. As shown in FIG. 2, the control section 30 is provided with a communication device 31, a storage device 32, and a processing device 33. These constituents are coupled to each other via a common bus so as to be able to communicate with each other.

The communication device 31 is a device capable of communicating with each of the display device 10, the first imaging device 21, and the second imaging device 22 wirelessly or with wire. Specifically, the communication device 31 has interface circuits for communicating with the display device 10, the first imaging device 21, and the second imaging device 22, respectively. For example, the communication device 31 includes a wired communication device such as wired LAN (Local Area Network), USB (Universal Serial Bus), or HDMI (High Definition Multimedia Interface), and a wireless communication device such as LPWA (Low Power Wide Area), wireless LAN including Wi-Fi, or Bluetooth. "Wi-Fi," "HDMI," and "Bluetooth" are each a registered trademark.

The storage device 32 is a device which stores a variety of programs to be executed by the processing device 33, and a variety of types of information to be processed by the processing device 33. The storage device 32 is constituted by, for example, a hard disk drive or a semiconductor memory. It should be noted that a part or the whole of the information stored in the storage device 32 can be stored in advance, or can also be obtained from an external device via the communication device 31 described above.

The storage device 32 stores program PG1, the learned model PJ, pre-passage behavior data DA1, post-passage behavior data DA2, the first imaging data DS1, the second imaging data DS2, and the content information DC.

The program PG1 is a program for making the processing device 33 function as the functional units described later.

The pre-passage behavior data DA1 is data which shows the features of the behavior of the human H who has not passed through the display position PD. The post-passage behavior data DA2 is data which shows the features of the behavior of the human H who has passed through the display position PD.

The content information DC includes image data representing the content to be displayed as the image G on the display device 10. The image data is data representing an image which prompts to call attention to the human H. The format of the image data is not particularly limited, but is, for example, the format of moving image data or still image data known to the public. Here, in the content information DC, in addition to the image data, there is included information related to a display method such as a position, timing, color, and brightness when displaying the image data.

In the present embodiment, the content information DC includes the audio data to be reproduced by the sound emitting device 12 besides the image data. The audio data is data representing a sound prompting to call attention to the human H. The format of the audio data is not particularly limited, but is, for example, an audio data format known to the public.

The learned model PJ is an estimation model obtained by performing the machine learning on a correspondence relation between the features of the behavior of the human H having not passed through the display position PD, the content information DC used for the image G, and the degree of risk of the human H having passed through the display position PD, so as to minimize the degree of risk of the human H having passed through the display position PD.

The processing device 33 is a processing device having a function of controlling each unit of the control device and a function of processing a variety of types of data. The processing device 33 includes a single processor or a plurality of processors such as a CPU (Central Processing Unit). It should be noted that a part or the whole of the processing device 33 can be realized by hardware such as a DSP (Digital Signal Processor), an ASIC (Application Specific Integrated Circuit), a PLD (Programmable Logic Device), or an FPGA (Field Programmable Gate Array).

The processing device 33 executes the program PG1 to thereby function as an acquisition unit 33a, a determination unit 33b, a display controller 33c, and a relearning unit 33d.

The acquisition unit 33a obtains the pre-passage behavior data DA1 based on the first imaging data DS1, and obtains the post-passage behavior data DA2 based on the second imaging data DS2.

The determination unit 33b determines the content information DC so as to minimize the degree of risk of the human H having passed through the display position PD using the pre-passage behavior data DA1 and the learned model PJ.

The display controller 33c makes the display device 10 display the image G based on the content information DC determined by the determination unit 33b.

The relearning unit 33d performs the relearning of the learned model PJ using the post-passage behavior data DA2. Here, as described later, it is possible to calculate the degree of risk of the human H having passed through the display position PD from the post-passage behavior data DA2. Therefore, the relearning unit 33d uses a set of the post-passage behavior data DA2 or the degree of risk calculated from the post-passage behavior data DA2, the pre-passage behavior data DA1, and the content information DC for the relearning.

1-3. Operation of Display System

Figure 3:
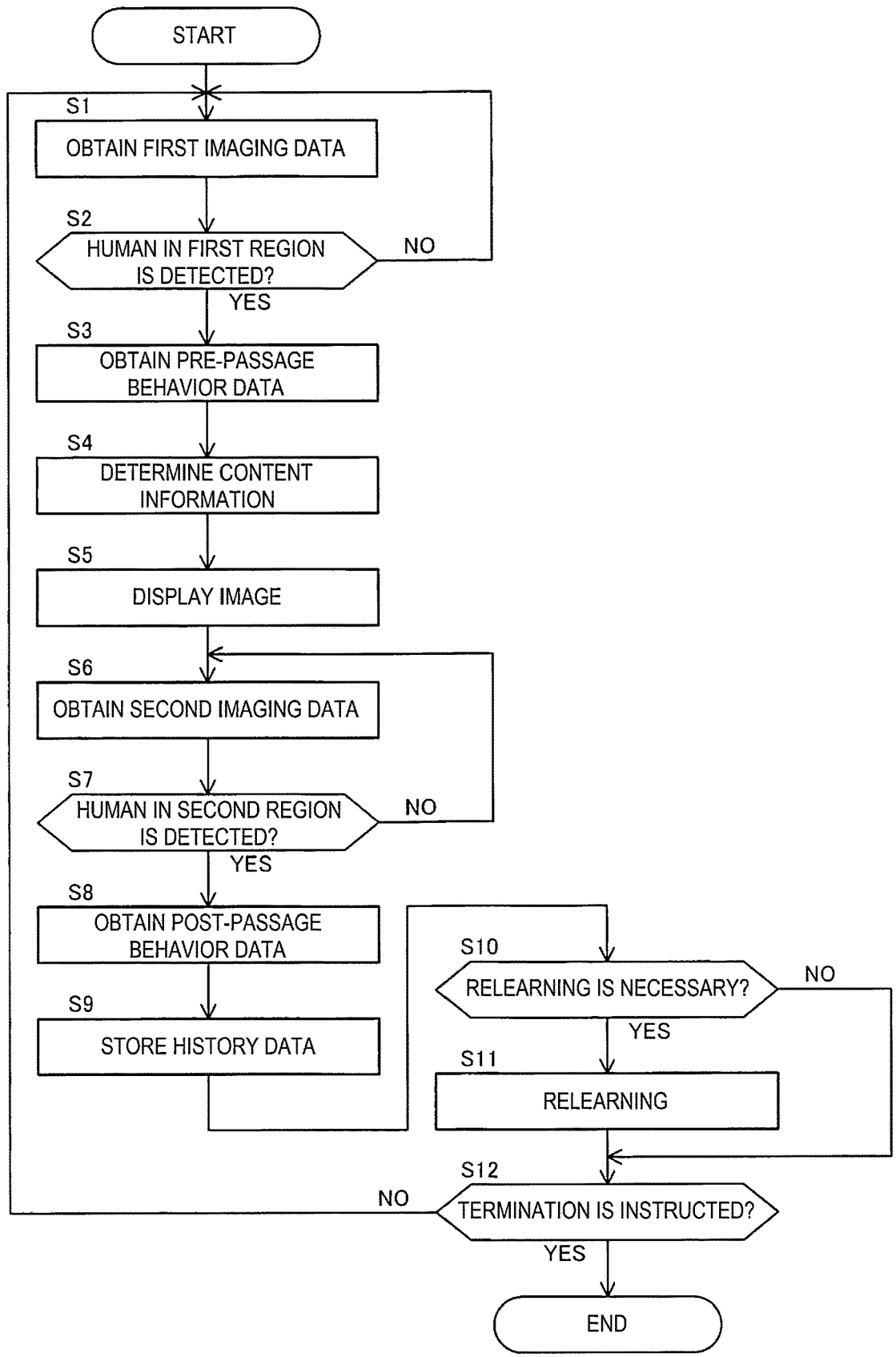
FIG. 3 is a flowchart showing an operation of the display system according to the first embodiment.

FIG. 3 is a flowchart showing an operation of the display system 1 according to the first embodiment. In the display system 1, first, as shown in FIG. 3, the acquisition unit 33a obtains the first imaging data DS1 in the step S1. The first imaging data DS1 thus obtained is stored in the storage device 32.

Then, in the step S2, the acquisition unit 33a determines whether or not the human H is present in the first region RE1. This determination is made by, for example, image processing for performing an object recognition setting a human as an object from the first imaging data DS1. When the human H is not present in the first region RE1 (NO in the step S2), the acquisition unit 33a returns to the step S1. The human H located in the first region RE1 corresponds to a first human.

When the human H is present in the first region RE1 (YES in the step S2), the acquisition unit 33a obtains the pre-passage behavior data DA1 in the step S3. In this acquisition, for example, it is possible to obtain the first imaging data DS1 in the period in which the human H is present in the first region RE1 directly as the pre-passage behavior data DA1, or to obtain the pre-passage behavior data DA1 by performing arbitrary processing necessary for the application to the learned model PJ on the first imaging data DS1 in the period in which the human His present in the first region RE1. The pre-passage behavior data DA1 obtained in the step S3 corresponds to first pre-passage behavior data.

Then, in the step S4, the determination unit 33b determines the content information DC using the pre-passage behavior data DA1 and the learned model PJ. This determination is performed by obtaining the content information DC as output data of the learned model PJ setting the pre-passage behavior data DA1 as input data. It should be noted that it is also possible to determine the content information DC by performing arbitrary post-processing on the output data of the learned model PJ. The content information DC determined in the step S4 corresponds to first content information.

Then, in the step S5, the display controller 33c makes the display device 10 display the image G based on the content information DC determined by the determination unit 33b.

Then, in the step S6, the acquisition unit 33a obtains the second imaging data DS2. The second imaging data DS2 thus obtained is stored in the storage device 32.

Then, in the step S7, the acquisition unit 33a determines whether or not the human H is present in the second region RE2. This determination is made by, for example, image processing for performing an object recognition setting a human as an object from the second imaging data DS2. When the human H is not present in the second region RE2 (NO in the step S7), the acquisition unit 33a returns to the step S6.

When the human H is present in the second region RE2 (YES in the step S7), the acquisition unit 33a obtains the post-passage behavior data DA2 in the step S8. In this acquisition, for example, it is possible to obtain the second imaging data DS2 in the period in which the human H is present in the second region RE2 directly as the post-passage behavior data DA2, or to obtain the post-passage behavior data DA2 by performing arbitrary processing necessary for the application to the learned model PJ on the second imaging data DS2 in the period in which the human H is present in the second region RE2.

Then, in the step S9, the relearning unit 33d associates the post-passage behavior data DA2 with the pre-passage behavior data DA1 and the content information DC corresponding to the post-passage behavior data DA2, and then store the result in the storage device 32 as history data.

Then, in the step S10, the relearning unit 33d determines whether or not the relearning is necessary. This determination is made based on, for example, whether or not the history data reaches a predetermined amount, or whether or not an accumulation period of the history data reaches a predetermined period. Further, it is also possible to periodically perform the relearning using data in the last predetermined period. Thus, it is possible to prevent reduction in effect due to human habituation. For example, it is possible to use a certain learned model PJ for one week as the accumulation period of the history data, and it is possible for the relearning unit 33d to associate the post-passage behavior data DA2 accumulated in that one week with the pre-passage behavior data DA1 and the content data DC corresponding to the post-passage behavior data DA2, and then store the result in the storage device 32 as the history data after that one week has elapsed.

When it is determined that the relearning is necessary (YES in the step S10), the relearning unit 33d performs the relearning of the learned model PJ in the step S11, and then makes the transition to the step S12. In contrast, when it is determined that the relearning is unnecessary (NO in the step S10), the relearning unit 33d makes the transition to the step S12 without performing the relearning of the learned model PJ.

In the step S12, the processing device 33 determines presence or absence of a termination instruction, and returns to the step S1 described above when the termination instruction is absent (NO in the step S12), or on the other hand, terminates the processing when the termination instruction is present (YES in the step S12).

1-4. Learned Model

Figure 4:
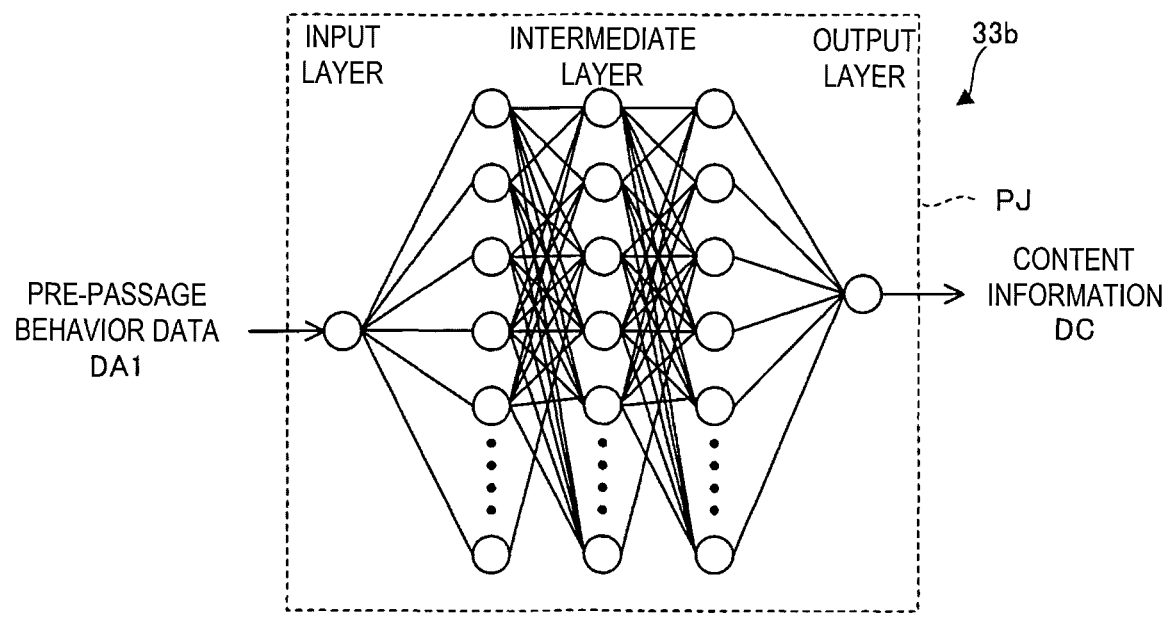
FIG. 4 is a diagram for explaining a learned model in the first embodiment.

FIG. 4 is a diagram for explaining the learned model PJ in the first embodiment. The learned model PJ is an estimation model for outputting the content information DC in accordance with input of the pre-passage behavior data DA1. Specifically, the learned model PJ is realized by a combination of a program of making the processing device 33 execute an operation of generating the content information DC from the pre-passage behavior data DA1, and a plurality of coefficients to be applied to that operation. That program is a program module which constitutes, for example, artificial intelligence software. That plurality of coefficients is set by, for example, deep learning using data set DST described later. In FIG. 4, as a preferred example, there is shown when the learned model PJ is a mathematical model such as a deep neural network having an input layer, an output layer, and an intermediate layer. It should be noted that the number of the intermediate layers is not limited to the example shown in FIG. 4, and is arbitrary.

Figure 5:
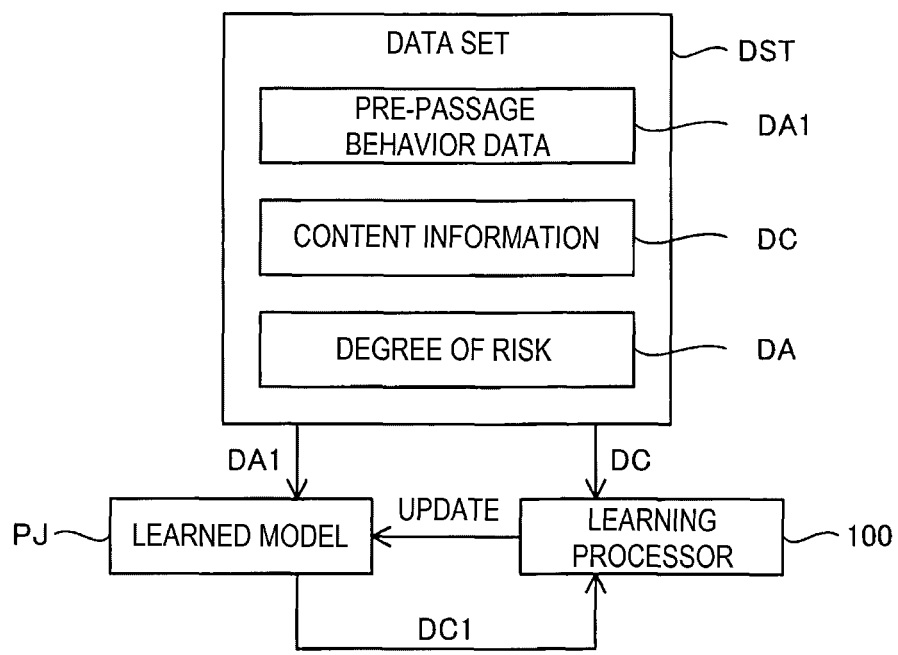
FIG. 5 is a diagram for explaining machine learning for generating the learned model in the first embodiment.

FIG. 5 is a diagram for explaining machine learning for generating the learned model PJ in the first embodiment. As shown in FIG. 5, generation of the learned model PJ is performed by the machine leaning in a learning device having a learning processor 100. In the machine learning, there is used a plurality of data sets DST. Each of the data sets DST includes the pre-passage behavior data DA1, the content information DC corresponding thereto, and the degree of risk based on the post-passage behavior data DA2. The pre-passage behavior data DA1 and the content information DC in the data set DST can be those generated using a separate device from the control device 30 described above.

As the data set DST, there is used a set of the degree of risk DA, the content information DC, and the pre-passage behavior data DA1, wherein the degree of risk DA is the degree of risk of the human H having passed through the display position PD, the content information DC is displayed on that occasion, and the pre-passage behavior data DA1 corresponds to the degree of risk DA and the content information DC. The degree of risk DA of the human H having passed through the display position PD can be calculated based on the post-passage behavior data DA2. For example, the degree of risk DA is represented by a difference between the features of a normal behavior of the human H having passed through the display position PD and the features represented by the post-passage behavior data DA2. The larger the difference is, the higher the degree of risk DA of the human H having passed through the display position PD is. The normal behavior means behavior data which is set in advance, and which is assumed to be statistically safe. The number of the normal behaviors set can be one, or two or more, and it is possible to obtain the differences between the features of the plurality of normal behaviors and the features represented by the post-passage behavior data DA2, respectively, and take the largest value of the differences as the degree of risk DA of the human H having passed through the display position PD.

The learning processor 100 sets a plurality of coefficients of the learned model PJ with supervised machine learning using the plurality of data sets DST. Specifically, the learning processor 100 updates the plurality of coefficients of the learned model PJ so as to reduce the difference between the content information DC1 output by a tentative learned model PJ with respect to the input of the pre-passage behavior data DA1 in the data set DST and the content information DC with which the degree of risk included in the data set DST is the lowest. For example, the learning processor 100 recurrently updates the plurality of coefficients of the learned model PJ with the error backpropagation so as to minimize an evaluation function representing a difference between the content information DC and the content information DC1. The learned model PJ described above on which the machine learning has been performed outputs the statistically reasonable content information DC to unknown pre-passage behavior data DA1 in the tendency underlying between the pre-passage behavior data DA1, the content information DC, and the degree of risk DA in the plurality of data sets DST. Thus, it is possible to change the image data of the content information DC or change the display method such as the position where the image G based on the image data is displayed, the timing, the luminance, and the color in accordance with the pre-passage behavior data DA1, and thus the degree of risk becomes lower than when the image G based on the image data is not displayed. Further, when determining the content information to be displayed, it is possible to display a certain percentage of random content. Thus, it is possible to add the relation between the pre-passage behavior data DA1, the content information DC, and the degree of risk DA to the data set DST, and thus, it is possible to collect necessary data in accordance with an installation place or a period to select an optimum content.

As described hereinabove, the display system 1 is provided with the display device 10, the first imaging device 21, the storage device 32, and the processing device 33. The display device 10 displays the image G based on the content information DC at the display position PD. The storage device 32 stores the learned model PJ obtained by performing the machine learning on the correspondence relation between the pre-passage behavior data DA1 representing the features of the behavior of the human H passing through the display position PD imaged by the first imaging device 21, the content information DC to be used for the image G, and the degree of risk of the human H having passed through the display position PD. The processing device 33 performs obtaining the first pre-passage behavior data DA1 representing the features of the behavior of the first human H who has not passed through the display position PD based on the imaging result of imaging the first human H who has not passed through the display position PD using the first imaging device 21, and determining the first content information DC to be used for the first image G corresponding to the first pre-passage behavior data DA1 using the first pre-passage behavior data DA1 and the learned model PJ.

In the display system 1 described hereinabove, the content information DC to be used for the image G to be displayed by the display device 10 is determined using the pre-passage behavior data DA1 and the learned model PJ so as to minimize the degree of risk of the human H having passed through the display position PD. Therefore, it is possible to draw attention effectively with the image G. Here, in the learned model PJ, the machine learning is performed on the correspondence relation so as to minimize the degree of risk of the human H having passed through the display position PD. Therefore, by using such a learned model PJ, it is possible to determine the effective content information DC so as to minimize the degree of risk of the human H having passed through the display position PD. As a result, it is possible to perform appropriate attention calling to the human H passing through the display position PD.

As described above, the processing device 33 performs determining at least one of the display position PD, the display timing of the first image G, and the display color or luminance of the first image G using the first pre-passage behavior data DA1 and the learned model PJ. For example, the content information DC includes not only the image data, but also the setting information related to at least one of the display position PD, the display timing of the image G, and the display color or the luminance of the image G, and the processing device 33 determines the content information DC using the pre-passage behavior data DA1 and the learned model PJ to thereby determine at least one of the display position PD, the display timing of the image G, and the display color or the luminance of the image G. Therefore, even when using the content information DC representing the same picture, it is possible to adjust the effect of the warning, caution, or the like by the image G based on the content information DC.

Further, as described above, the display system 1 is further provided with the second imaging device 22. Further, the processing device 33 performs obtaining the first degree of risk DA based on the first post-passage behavior data DA2 representing the features of the behavior of the first human H who has passed through the display position PD based on the imaging result of imaging the first human H who has passed through the display position PD using the second imaging device 22, and relearning the learned model PJ using the first degree of risk DA. Therefore, it is possible to reduce the deterioration of the effect of the warning, caution, or the like by the image G based on the content information DC due to the human habituation and so on.

Further, as described above, the processing device 33 makes the display device 10 display the first image G at the display position PD based on the first content information DC. Therefore, it is possible to obtain an effect such as the warning, caution, or the like by the image G based on the content information DC.

Further, as described above, the first content information DC to be used for the first image G includes the image data. Therefore, it is possible to display the image G based on the content information DC at the display position PD using the display device 10.

Further, as described above, the display system 1 is further provided with the sound emitting device 12 for emitting a sound around the display position PD. Further, the first content information DC to be used for the first image G includes the audio data. Further, the processing device 33 performs emitting the sound based on the first content information DC using the sound emitting device 12. Therefore, it is possible to obtain an effect of the warning, caution, or the like by the sound based on the content information DC. Therefore, even when, for example, the gaze of the human H having not passed through the display position PD is removed from the display position PD, the effect of the warning, caution, or the like can be obtained.

Further, as described above, the first degree of risk DA is represented by a difference between the features set in advance to the human H having passed through the display position PD and the features represented by the first post-passage behavior data DA2. Therefore, it is possible to make the learned model PJ or perform the relearning of the learned model PJ using the post-passage behavior data DA2.

Further, as described above, the first pre-passage behavior data DA1 represents the features of the behavior of the first human H going through the first region RE1. In contrast, the first post-passage behavior data DA2 represents the features of the behavior of the first human H going through the second region RE2 different from the first region RE1. Here, the display position PD is located between the first region RE1 and the second region RE2. Therefore, it is possible to obtain the pre-passage behavior data DA1 based on the result obtained by imaging the human H in the first region RE1. Further, it is possible to obtain the post-passage behavior data DA2 based on the result obtained by imaging the human H in the second region RE2.

Further, as described above, the display system 1 uses the program PG1. The program PG1 makes the control device 30 execute obtaining the first pre-passage behavior data DA1 representing the features of the behavior of the first human H having not passed through the display position PD based on the imaging result of imaging the first human H having not passed through the display position PD of the first image G based on the first content information DC, and determining the first content information DC to be used for the first image G using the learned model PJ obtained by performing the machine learning on the correspondence relation between the features of the behavior of the human H having not passed through the display position PD, the content information DC to be used for the image G, and the degree of risk of the human H having passed through the display position PD, and the first pre-passage behavior data DA1. The control device 30 is an example of a "computer." Therefore, it is possible to realize such a display system 1 as described above.

2. Second Embodiment

The second embodiment will hereinafter be described. The constituents common to the present embodiment and the first embodiment will be denoted by the same reference symbols, and the description thereof will be omitted. It should be noted that the explanation will hereinafter be presented with a focus on matters different from the first embodiment described above, and the explanation of substantially the same matters will be omitted.

Figure 6:
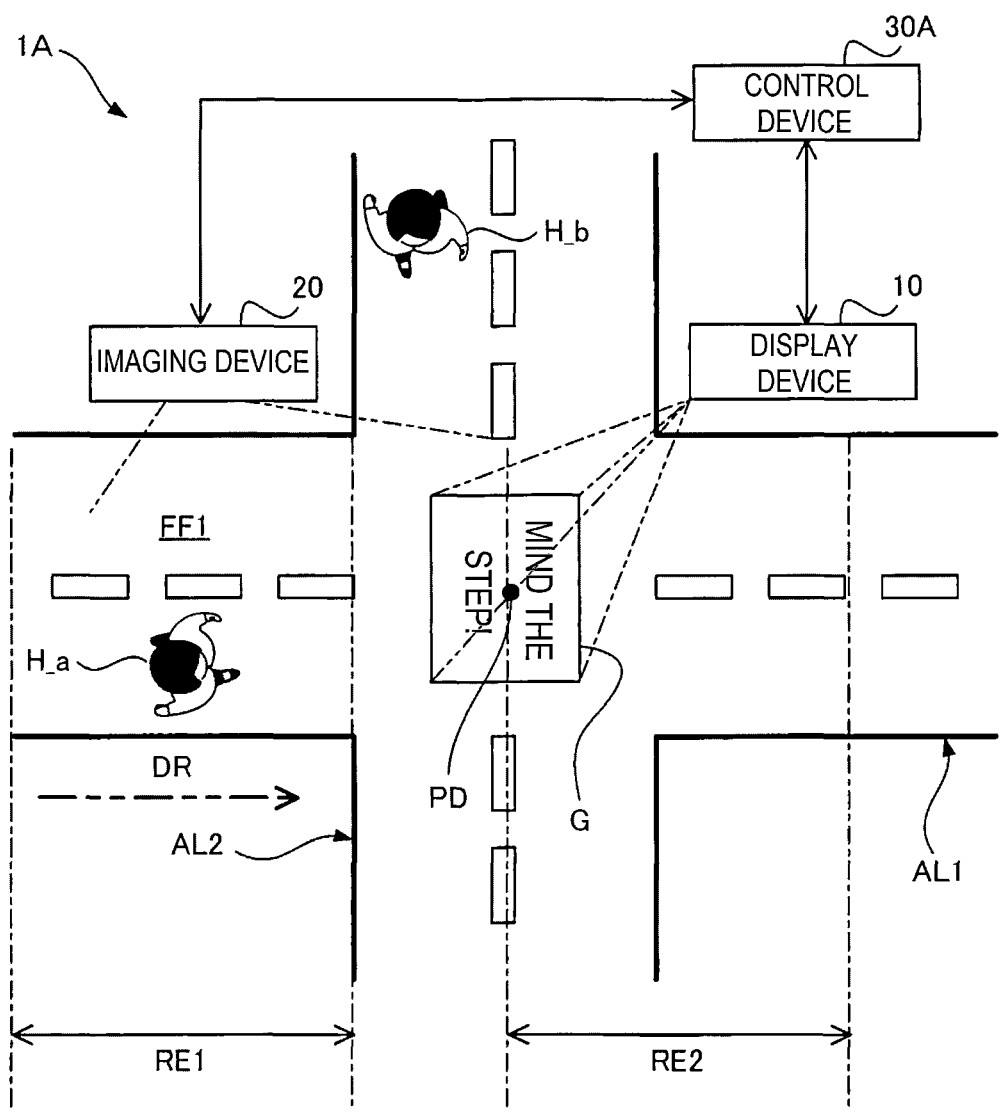
FIG. 6 is a schematic diagram of a display system according to a second embodiment.

FIG. 6 is a schematic diagram of a display system 1A according to the second embodiment. The display system 1A is configured similarly to the display system 1 according to the first embodiment described above except the fact that the installation place is different, and at the same time, the display content of the image G is different. Here, the display system 1A is configured similarly to the display system 1 according to the first embodiment described above except the fact that an imaging device 20 is provided instead of the first imaging device 21 and the second imaging device 22, and at the same time, a control device 30A is provided instead of the control device 30. The imaging device 20 is configured similarly to the first imaging device 21 and the second imaging device 22 except the fact that the imaging device 20 images both of the first region RE1 and the second region RE2.

In the example shown in FIG. 6, an aisle AL1 and an aisle AL2 form a cross road, and the display system 1A performs attention calling with the image G to the human H_a going through the aisle AL'. Here, the display position PD is located around a crossing of the cross road. Further, the first region RE1 is set in the aisle AL1 at a rear side in the traveling direction of the human H_a with respect to the display position PD. The second region RE2 is set in the aisle AL1 at a front side in the traveling direction of the human H_a with respect to the display position PD.

It should be noted that the aspect of a width, a shape, or the like of the aisles AL1, AL2 is not limited to the example shown in FIG. 6, and is arbitrary. Further, the display position PD is not limited to the example shown in FIG. 6, and can be, for example, a position on a screen disposed in the aisle AL1, or a position on wall surfaces at both sides of the aisle AL1 or on a surface of the ceiling.

When the human H_a in the first region RE1 seems to collide with a human H_b on the aisle AL2, the control device 30A makes the display device 10 display the image G. Thus, the attention calling to the human H_a is performed. In FIG. 6, there is illustrated the image G representing that the attention to the collision with the human H_b is called to the human H_a.

According also to the second embodiment described above, it is possible to perform the appropriate attention calling to the human H_a passing through the display position PD.

3. Third Embodiment

The third embodiment will hereinafter be described. The constituents common to the present embodiment and the first embodiment will be denoted by the same reference symbols, and the description thereof will be omitted. It should be noted that the explanation will hereinafter be presented with a focus on matters different from the first embodiment described above, and the explanation of substantially the same matters will be omitted.

Figure 7:
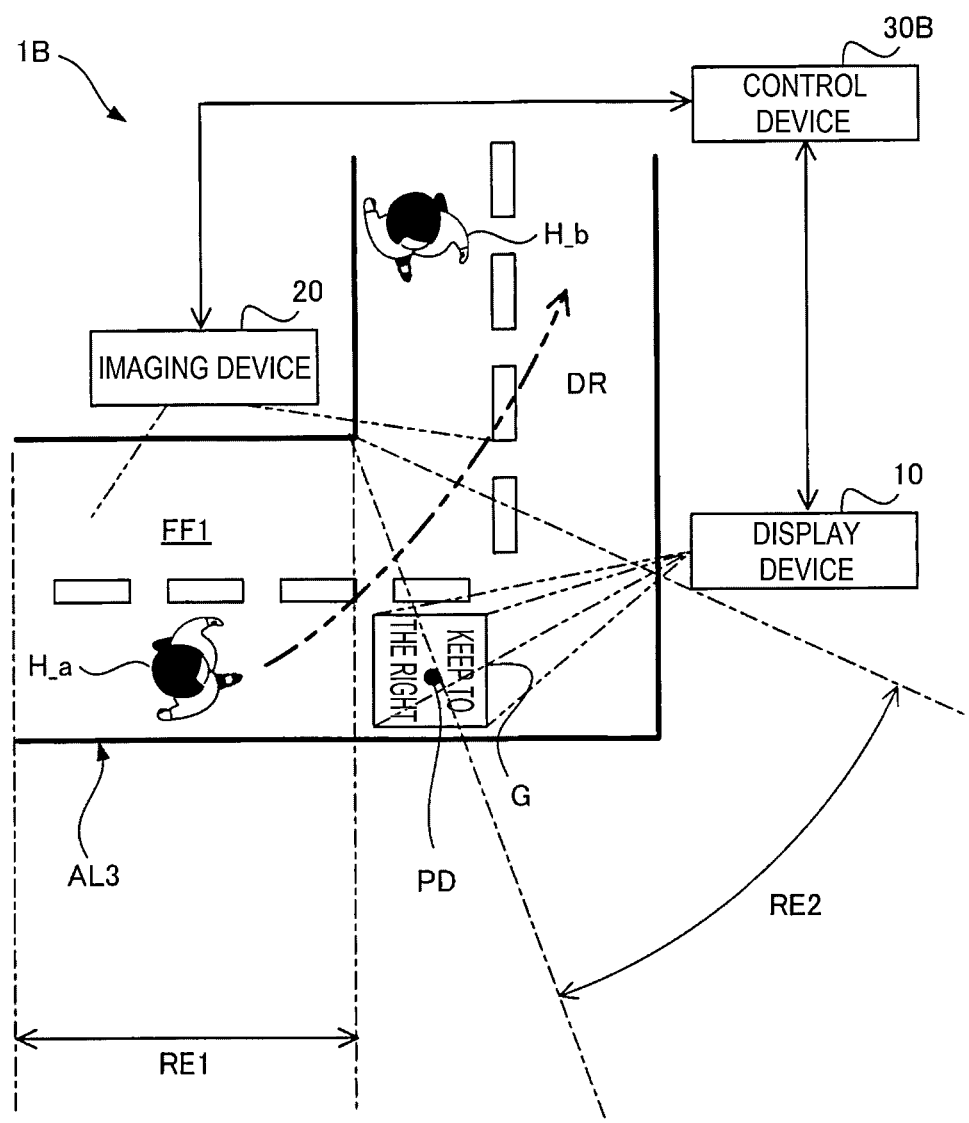
FIG. 7 is a schematic diagram of a display system according to a third embodiment.

FIG. 7 is a schematic diagram of a display system 1B according to the third embodiment. The display system 1B is configured similarly to the display system 1 according to the first embodiment described above except the fact that the installation place is different, and at the same time, the display content of the image G is different. Here, the display system 1B is configured similarly to the display system 1 according to the first embodiment described above except the fact that an imaging device 20 is provided instead of the first imaging device 21 and the second imaging device 22, and at the same time, a control device 30B is provided instead of the control device 30. The imaging device 20 is configured similarly to the first imaging device 21 and the second imaging device 22 except the fact that the imaging device 20 images both of the first region RE1 and the second region RE2.

In the example shown in FIG. 7, the display system 1B performs the attention calling with the image G to the human H_a passing through an aisle AL3 having a corner. Here, the display position PD is located around the corner. Further, the first region RE1 is set in the aisle AL3 at a rear side in the traveling direction of the human H_a with respect to the display position PD. The second region RE2 is set in the aisle AL3 at a front side in the traveling direction of the human H_a with respect to the display position PD.

It should be noted that the aspect of a width, a shape, or the like of the aisle AL3 is not limited to an example shown in FIG. 7, and is arbitrary. Further, the display position PD is not limited to the example shown in FIG. 7, and can be, for example, a position on a screen disposed in the aisle AL3, or a position on wall surfaces at both sides of the aisle AL3 or on a surface of the ceiling.

When the human H_a in the first region RE1 seems to collide with the human H_b on the aisle AL3, the control device 30B makes the display device 10 display the image G. Thus, the attention calling to the human H_a is performed. In FIG. 7, there is illustrated the image G for displaying that keeping to the right with the human H_b is called to the human H_a who attempts to turn the corner crossing the center line of the aisle AL3.

According also to the third embodiment described above, it is possible to perform the appropriate attention calling to the human H_a passing through the display position PD.

4. Fourth Embodiment

The fourth embodiment will hereinafter be described. The constituents common to the present embodiment and the first embodiment will be denoted by the same reference symbols, and the description thereof will be omitted. It should be noted that the explanation will hereinafter be presented with a focus on matters different from the first embodiment described above, and the explanation of substantially the same matters will be omitted.

Figure 8:
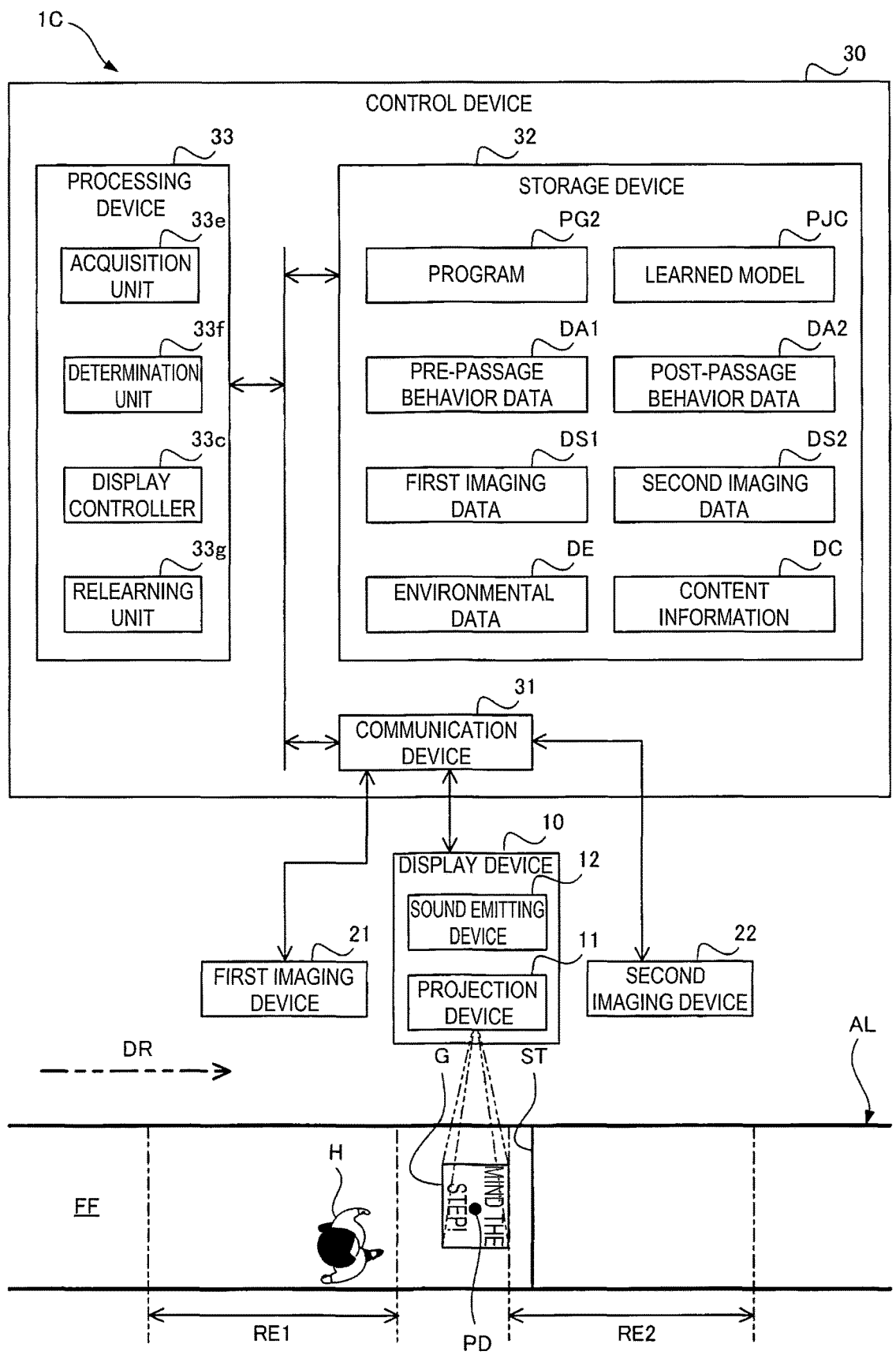
FIG. 8 is a block diagram of a display system according to a fourth embodiment.

FIG. 8 is a block diagram of a display system 1C according to the fourth embodiment. The display system 1C is configured similarly to the display system 1 according to the first embodiment described above except the fact that a program PG2 is used instead of the program PG1, and at the same time, a learned model PJC is used instead of the learned model PJ.

The processing device 33 executes the program PG2 to thereby function as an acquisition unit 33e, a determination unit 33f, the display controller 33c, and a relearning unit 33g.

The acquisition unit 33e functions similarly to the acquisition unit 33a in the first embodiment except the fact that there is added a function of obtaining environmental data DE based on the first imaging data DS1 or the second imaging data DS2. The environmental data DE is data related to a surrounding environment of the display position PD such as existence of the step ST, wetting or freeze of the floor surface FF, or darkness. The acquisition unit 33e extracts information related to the risk of the human H as the environmental data DE using image processing of performing the object recognition from the first imaging data DS1 or the second imaging data DS2.

The determination unit 33f determines the content information DC so as to minimize the degree of risk of the human H having passed through the display position PD using the pre-passage behavior data DA1 and the learned model PJC.

The learned model PJC is an estimation model obtained by performing the machine learning on a correspondence relation between the features of the behavior of the human H having not passed through the display position PD, the content information DC used for the image G, and the environmental data DE, so as to minimize the degree of risk of the human H having passed through the display position PD.

The display controller 33c makes the display device 10 display the image G based on the content information DC determined by the determination unit 33f.

The relearning unit 33g performs the relearning of the learned model PJC using the post-passage behavior data DA2.

Figure 9:
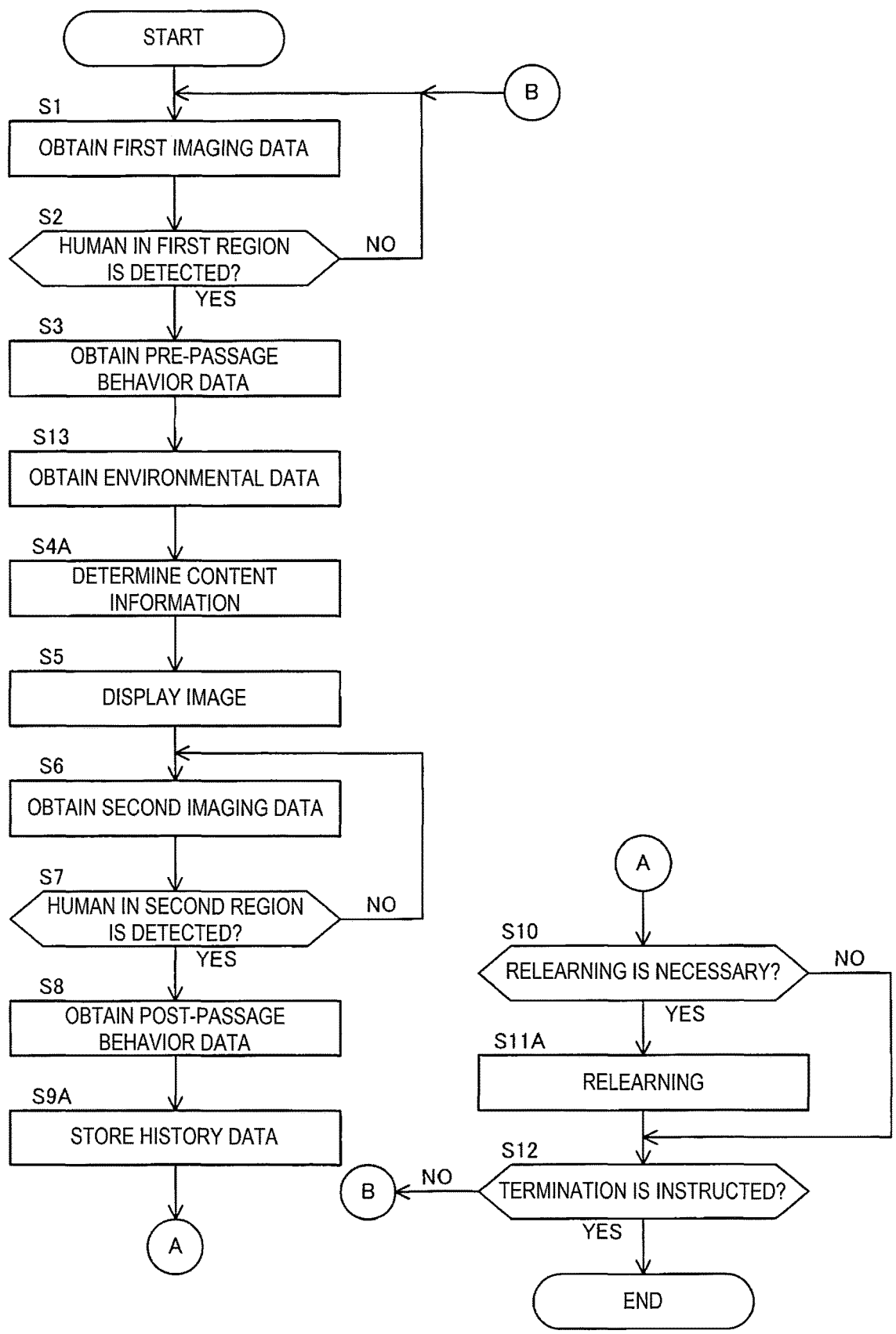
FIG. 9 is a flowchart showing an operation of the display system according to the fourth embodiment.

FIG. 9 is a flowchart showing an operation of the display system 1C according to the fourth embodiment. The operation of the display system 1C is substantially the same as the operation of the display system. 1 according to the first embodiment except the fact that the step S13 is added, and at the same time, the steps S4A, S9A, and S11A are included instead of the steps S4, S9, and S11.

In the display system 1C, as shown in FIG. 9, the acquisition unit 33e obtains the environmental data DE in the step S13 after the step S3. Then, in the step S4A, the determination unit 33f determines the content information DC using the pre-passage behavior data DA1 and the learned model PJC. Subsequently, in the step S5, the display controller 33c makes the display device 10 display the image G based on the content information DC.

Further, after the step S8, in the step S9A, the relearning unit 33g associates the post-passage behavior data DA2 with the environmental data DE, the pre-passage behavior data DA1, and the content information DC corresponding to the post-passage behavior data DA2, and then store the result in the storage device 32 as the history data.

Further, when it is determined in the step S10 that the relearning is necessary (YES in the step S10), the relearning unit 33g performs the relearning of the learned model PJC in the step S11A, and then makes the transition to the step S12. In contrast, when it is determined that the relearning is unnecessary (NO in the step S10), the relearning unit 33g makes the transition to the step S12 without performing the relearning of the learned model PJC.

Figure 10:
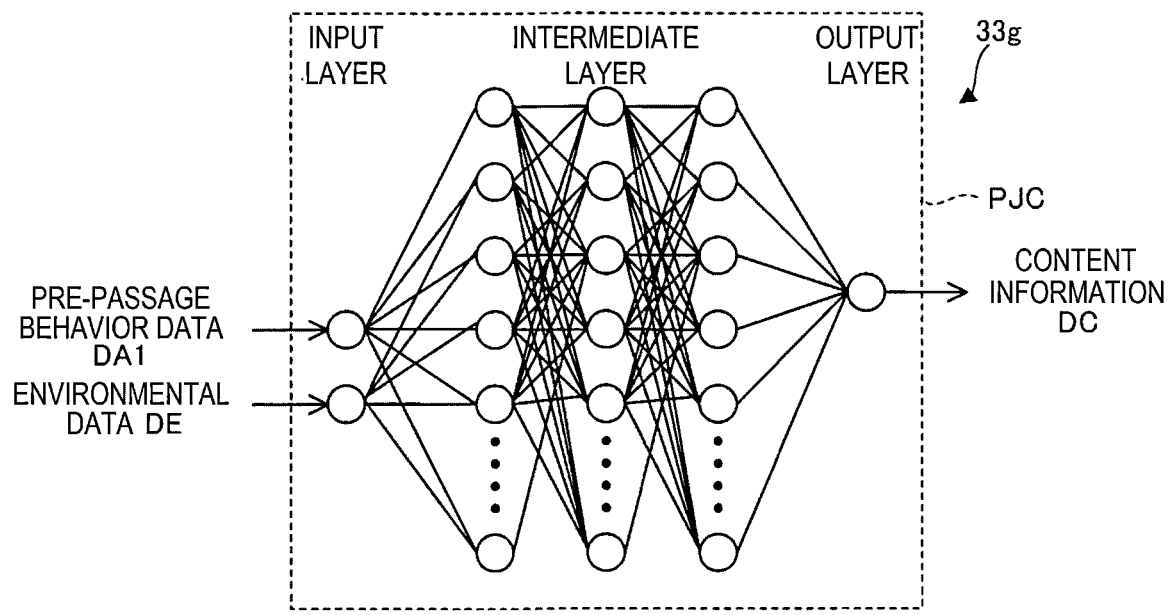
FIG. 10 is a diagram for explaining a learned model in the fourth embodiment.

FIG. 10 is a diagram for explaining the learned model PJC in the fourth embodiment. The learned model PJC is an estimation model for outputting the content information DC in accordance with input of the pre-passage behavior data DA1 and the environmental data DE. Specifically, the learned model PJC is realized by a combination of a program of making the processing device 33 execute an operation of generating the content information DC from the pre-passage behavior data DA1 and the environmental data DE, and a plurality of coefficients to be applied to that operation. That program is a program module which constitutes, for example, artificial intelligence software. That plurality of coefficients is set by, for example, deep learning using data set DST1 described later. In FIG. 10, as a preferred example, there is shown when the learned model PJC is a mathematical model such as a deep neural network having an input layer, an output layer, and an intermediate layer. It should be noted that the number of the intermediate layers is not limited to the example shown in FIG. 10, and is arbitrary.

Figure 11:
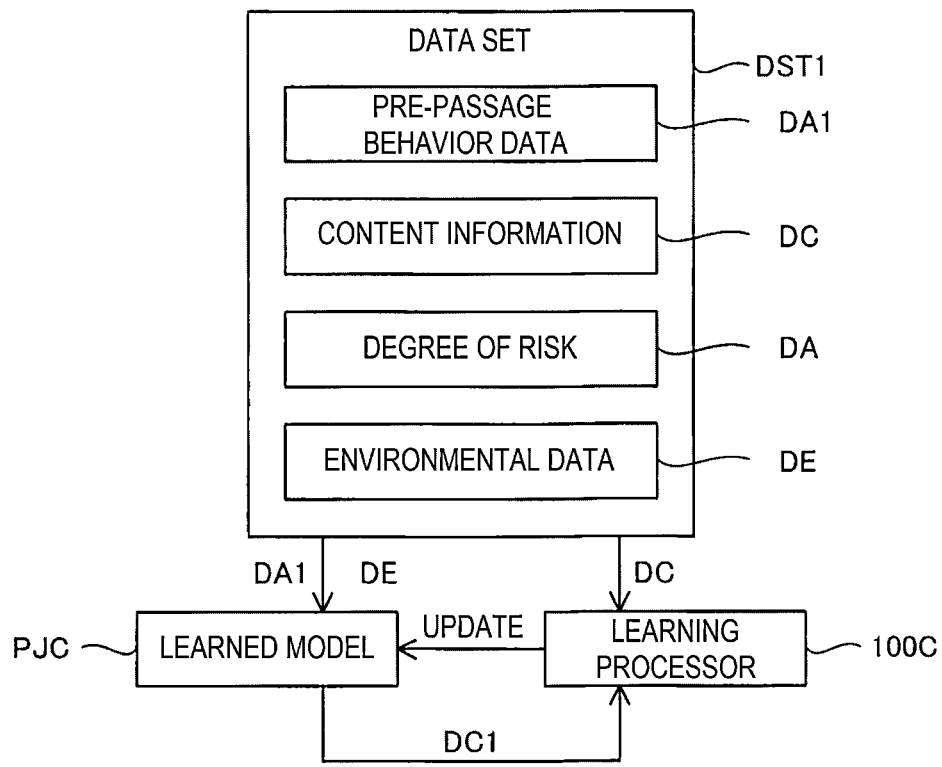
FIG. 11 is a diagram for explaining machine learning for generating the learned model in the fourth embodiment.

FIG. 11 is a diagram for explaining machine learning for generating the learned model PJC in the fourth embodiment. As shown in FIG. 11, generation of the learned model PJC is performed by the machine leaning in a learning device having a learning processor 100C. In the machine learning, there is used a plurality of data sets DST1. Each of the data sets DST1 includes the pre-passage behavior data DA1, the degree of risk DA, the environmental data DE, and the content information DC corresponding to the pre-passage behavior data DA1. The degree of risk DA, the environmental data DE, the pre-passage behavior data DA1, and the content information DC in the data set DST1 can be those generated using a separate device from the control device 30C described above.

As the data set DST1, there is used a set of the degree of risk DA, the content information DC, the environmental data DE, and the pre-passage behavior data DA1, wherein the degree of risk DA is the degree of risk of the human H having passed through the display position PD, the content information DC is displayed on that occasion, and the environmental data DE and the pre-passage behavior data DA1 correspond to the degree of risk DA and the content information DC.

The learning processor 100C sets a plurality of coefficients of the learned model PJC with supervised machine learning using the plurality of data sets DST1. Specifically, the learning processor 100C updates the plurality of coefficients of the learned model PJC so as to reduce the difference between the content information DC1 output by a tentative learned model PJC with respect to the input of the environmental data DE and the pre-passage behavior data DA1 in the data set DST1, and the content information DC with which the degree of risk DA included in the data set DST1 is the lowest. For example, the learning processor 100C recurrently updates the plurality of coefficients of the learned model PJC with the error backpropagation so as to minimize an evaluation function representing a difference between the content information DC and the content information DC1. The learned model PJC described above on which the machine learning has been performed outputs the statistically reasonable content information DC to unknown environmental data DE and pre-passage behavior data DA1 in the tendency underlying between the environmental data DE, the pre-passage behavior data DA1, and the content information DC in the plurality of data sets DST1. Thus, it is possible to change the image data of the content information DC or change the display method such as the position where the image G based on the image data is displayed, the timing, the luminance, and the color in accordance with the environmental data DE and the pre-passage behavior data DA1. The environmental data DE to be used for the output of the content information DC corresponds to first environmental data.

According also to the fourth embodiment described hereinabove, it is possible to perform appropriate attention calling to the human H passing through the display position PD. In the present embodiment, as described above, the correspondence relation of the learned model PJC includes a relation between the pre-passage behavior data DA1, the content information DC, the degree of risk DA, and the environmental data DE related to the surrounding environment of the display position PD. The processing device 33 performs obtaining the first environmental data DE when the first human H passes through the display position PD, and determining the first content information DC using the first environmental data DE, the first pre-passage behavior data DA1 and the learned model PJC. Therefore, it is possible to determine the appropriate content information DC in accordance with a change in surrounding environment.

Further, as described above, the surrounding environment of the display position PD is an environment related to the risk of the human H in an area including the display position PD. Therefore, it is possible to obtain the information related to the surrounding environment of the display position PD based on the result obtained by imaging that area.

5. Fifth Embodiment

The fifth embodiment will hereinafter be described. The constituents common to the present embodiment and the first embodiment will be denoted by the same reference symbols, and the description thereof will be omitted. It should be noted that the explanation will hereinafter be presented with a focus on matters different from the first embodiment described above, and the explanation of substantially the same matters will be omitted.

Figure 12:
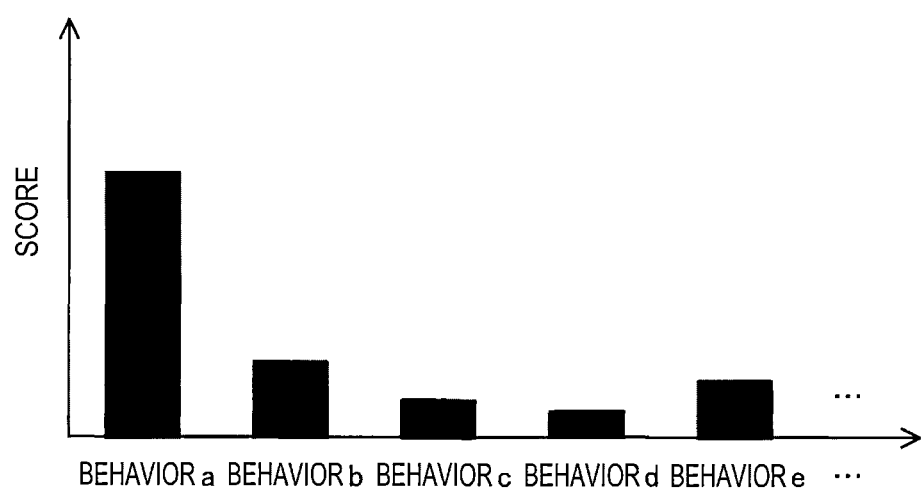
FIG. 12 is a diagram showing an example of scores of the respective behaviors based on pre-passage behavior data.

FIG. 12 is a diagram showing an example of scores of the respective behaviors based on the pre-passage behavior data DA1. It is possible to classify the behaviors which can occur before the passage of the display position PD to make the learned model PJ using the pre-passage behavior data DA1 corresponding to each of the behaviors, and the post-passage behavior data DA2 corresponding thereto, and the content information DC. Thus, it is possible to select the content information DC representing the warning display using the learned model PJ the most suitable for each of the behaviors a, b, c, d, and e shown in FIG. 12.

The behaviors a, b, c, d, e, . . . shown in FIG. 12 are, for example, "speeding," "tripping," "mobile phone use while walking," "pockets-in," and "collision warning." It should be noted that the number of behaviors to be classified is not limited to the example shown in FIG. 12, and is arbitrary.

6. Modified Examples

Each of the aspects illustrated hereinabove can variously be modified. Some aspects of the specific modifications which can be applied to each of the aspects described above will be illustrated below. Two or more aspects arbitrarily selected from the following illustrations can arbitrarily be combined with each other unless conflicting with each other.

6-1. Modified Example 1

In each of the aspects described above, there is illustrated the configuration in which the control device 30 and the display device 10 are separated from each other, but that configuration is not a limitation, and it is possible for the control device 30 to be a part of the display device 10.

6-2. Modified Example 2

In each of the aspects described above, there is illustrated the configuration in which the projection device is used as the display device, but that configuration is not a limitation, and it is possible for the display device to use a device which adopts, for example, a liquid crystal display panel or an organic EL (electro-luminescence) panel as the display surface, as the optical device.

7. Conclusion of Present Disclosure

Hereinafter, the conclusion of the present disclosure will supplementarily be noted.

Supplementary Note 1

A display system including a display device configured to display an image based on content information at a display position, a first imaging device, a storage device configured to store a learned model obtained by performing machine learning on a correspondence relation between pre-passage behavior data representing features of a behavior of a human who is going to pass through the display position imaged by the first imaging device, the content information to be used for the image, and a degree of risk of the human who passed through the display position, and a processing device, wherein the processing device performs obtaining first pre-passage behavior data representing features of a behavior of a first human who is going to pass through the display position based on an imaging result obtained by imaging the first human who is going to pass through the display position using the first imaging device, and determining first content information to be used for a first image corresponding to the first pre-passage behavior data using the first pre-passage behavior data and the learned model. Thus, since the content information to be used for the image to be displayed by the display device is determined so as to minimize the degree of risk of the human who passed through the display position using the pre-passage behavior data and the learned model, it is possible to perform effective attention calling with the image. Therefore, by using the learned model, it is possible to determine the corresponding first content information from the first pre-passage behavior data. As a result, it is possible to perform appropriate attention calling to the human passing through the display position.

Supplementary Note 2

The display system according to Supplementary Note 1, wherein the correspondence relation includes a relation between the pre-passage behavior data, the content information, the degree of risk, and environmental data related to a surrounding environment of the display position, and the processing device performs obtaining first environmental data when the first human passes through the display position, and determining the first content information using the first environmental data, the first pre-passage behavior data, and the learned model. Thus, it is possible to determine the appropriate content information in accordance with a change in surrounding environment.

Supplementary Note 3

The display system according to Supplementary Note 1 or Supplementary Note 2, wherein the processing device performs determining at least one of the display position, display timing of the first image, and a display color or luminance of the first image using the first pre-passage behavior data and the learned model. Thus, even when using the content information representing the same picture, it is possible to adjust the effect of the warning, caution, or the like by the image based on the content information.

Supplementary Note 4

The display system according to any one of Supplementary Note 1 through Supplementary Note 3, further including a second imaging device, wherein the processing device performs obtaining first degree of risk based on first post-passage behavior data representing features of a behavior of the first human who passed through the display position based on an imaging result obtained by imaging the first human who passed through the display position using the second imaging device, and relearning the learned model using the first degree of risk. Thus, it is possible to reduce the deterioration of the effect of the warning, caution, or the like by the image based on the content information due to the human habituation and so on.

Supplementary Note 5

The display system according to any one of Supplementary Note 1 through Supplementary Note 4, wherein the processing device makes the display device display the first image at the display position based on the first content information. Thus, it is possible to obtain an effect such as the warning, caution, or the like by the image based on the content information.

Supplementary Note 6

The display system according to any one of Supplementary Note 1 through Supplementary Note 5, wherein the first content information to be used for the first image includes image data. Thus, it is possible to display the image based on the content information at the display position using the display device.

Supplementary Note 7

The display system according to Supplementary Note 6, further including a sound emitting device configured to emit a sound around the display position, wherein the first content information to be used for the first image includes audio data, and the processing device makes the sound emitting device emit a sound based on the first content information. Thus, it is possible to obtain an effect such as the warning, caution, or the like by the sound based on the content information. Therefore, even when, for example, the gaze of the human who is going to pass through the display position is removed from the display position, the effect of the warning, caution, or the like can be obtained.

Supplementary Note 8

The display system according to Supplementary Note 4, wherein the first degree of risk is represented by a difference between features set in advance to the human who passed through the display position and features represented by the first post-passage behavior data. Thus, it is possible to make the learned model or perform the relearning of the learned model using the post-passage behavior data.

Supplementary Note 9

The display system according to Supplementary Note 4 or Supplementary Note 8, wherein the first pre-passage behavior data represents features of a behavior of the first human passing through a first region, the first post-passage behavior data represents features of a behavior of the first human passing through a second region different from the first region, and the display position is located between the first region and the second region. Thus, it is possible to obtain the pre-passage behavior data based on a result obtained by imaging the human in the first region. Similarly, it is possible to obtain the post-passage behavior data based on a result obtained by imaging the human in the second region.

Supplementary Note 10

The display system according to Supplementary Note 2, wherein a surrounding environment of the display position is an environment related to a risk of the human in an area including the display position. Thus, it is possible to obtain the information related to the surrounding environment of the display position based on the result obtained by imaging that area.

Supplementary Note 11

A display device configured to display an image based on content information at a display position, including a storage device configured to store a learned model obtained by performing machine learning on a correspondence relation between pre-passage behavior data representing features of a behavior of a human who is going to pass through the display position, the content information to be used for the image, and a degree of risk of a human who passed through the display position, and a processing device, wherein the processing device performs obtaining first pre-passage behavior data representing features of a behavior of a first human who is going to pass through the display position based on an imaging result obtained by imaging the first human who is going to pass through the display position, and determining first content information to be used for a first image corresponding to the first pre-passage behavior data using the first pre-passage behavior data and the learned model. Thus, it is possible to perform appropriate attention calling to the human passing through the display position.

Supplementary Note 12

A non-transitory computer-readable storage medium storing a program configured to make a computer execute processing including obtaining first pre-passage behavior data representing features of a behavior of a first human who is going to pass through the display position based on an imaging result obtained by imaging the first human who is going to pass through the display position of a first image based on first content image, and determining first content information to be used for the first image using a learned model obtained by performing machine learning on a correspondence relation between features of a behavior of a human who is going to pass through the display position, content information to be used for an image, and a degree of risk of the human who passed through the display position, and the first pre-passage behavior data. Thus, it is possible to perform appropriate attention calling to the human passing through the display position.

What is claimed is:

1. A display system comprising:
   a display device configured to display an image based on content information at a display position;
   a first imaging device;
   a storage device configured to store a learned model obtained by performing machine learning on a correspondence relation between pre-passage behavior data representing features of a behavior of a human who is going to pass through the display position imaged by the first imaging device, the content information to be used for the image, and a degree of risk of the human who passed through the display position; and
   a processing device which performs
      obtaining first pre-passage behavior data representing features of a behavior of a first human who is going to pass through the display position based on an imaging result obtained by imaging the first human who is going to pass through the display position using the first imaging device, and
      determining first content information to be used for a first image corresponding to the first pre-passage behavior data using the first pre-passage behavior data and the learned model, wherein
   the correspondence relation includes a relation between the pre-passage behavior data, the content information, the degree of risk, and environmental data related to a surrounding environment of the display position, and
   the environmental data includes at least one of (1) whether there is a step ahead of the display position, (2) whether a floor surface ahead of the display position is wet or frozen, or (3) whether an area ahead of the display position is dark.

2. The display system according to claim 1, wherein
   the processing device performs
      obtaining first environmental data when the first human passes through the display position, and
      determining the first content information using the first environmental data,
   the first pre-passage behavior data, and the learned model.

3. The display system according to claim 1, wherein
   the processing device performs determining at least one of the display position, display timing of the first image, and a display color or luminance of the first image using the first pre-passage behavior data and the learned model.

4. The display system according to claim 1, further comprising:
   a second imaging device, wherein
   the processing device performs
      obtaining first degree of risk based on first post-passage behavior data representing features of a behavior of the first human who passed through the display position based on an imaging result obtained by imaging the first human who passed through the display position using the second imaging device, and
      relearning the learned model using the first degree of risk.

5. The display system according to claim 4, wherein
   the first degree of risk is represented by a difference between features set in advance to the human who passed through the display position and features represented by the first post-passage behavior data.

6. The display system according to claim 4, wherein
   the first pre-passage behavior data represents features of a behavior of the first human passing through a first region,
   the first post-passage behavior data represents features of a behavior of the first human passing through a second region different from the first region, and
   the display position is located between the first region and the second region.

7. The display system according to claim 1, wherein
   the processing device makes the display device display the first image at the display position based on the first content information.

8. The display system according to claim 1, wherein
   the first content information to be used for the first image includes image data.

9. The display system according to claim 8, further comprising:
   a sound emitting device configured to emit a sound around the display position, wherein
   the first content information to be used for the first image includes audio data, and the processing device makes the sound emitting device emit a sound based on the first content information.

10. A display device which displays an image comprising:

a storage device configured to store
- a learned model obtained by performing machine learning on a correspondence relation between pre-passage behavior data representing features of a behavior of a human who is going to pass through a display position of the image,
- content information to be used for displaying the image, and
- a degree of risk of a human who passed through the display position; and a processing device which performs
- obtaining first pre-passage behavior data representing features of a behavior of a first human who is going to pass through the display position based on an imaging result obtained by imaging the first human who is going to pass through the display position, and
- determining first content information to be used for a first image corresponding to the first pre-passage behavior data using the first pre-passage behavior data and the learned model, wherein the correspondence relation includes a relation between the pre-passage behavior data, the content information, the degree of risk, and environmental data related to a surrounding environment of the display position, and the environmental data includes at least one of (1) whether there is a step ahead of the display position, (2) whether a floor surface ahead of the display position is wet or frozen, or (3) whether an area ahead of the display position is dark.

11. A non-transitory computer-readable storage medium storing a program configured to make a computer execute processing comprising:

- obtaining pre-passage behavior data representing features of a behavior of a human who is going to pass through a display position based on an imaging result obtained by imaging the human who is going to pass through the display position of an image based on content image; and
- determining content information to be used for the image using a learned model obtained by performing machine learning on a correspondence relation between features of a behavior of a human who is going to pass through the display position, content information to be used for an image, and a degree of risk of the human who passed through the display position, and the pre-passage behavior data, wherein the correspondence relation includes a relation between the pre-passage behavior data, the content information, the degree of risk, and environmental data related to a surrounding environment of the display position, and the environmental data includes at least one of (1) whether there is a step ahead of the display position, (2) whether a floor surface ahead of the display position is wet or frozen, or (3) whether an area ahead of the display position is dark.

* * * * *